Oct. 28, 1952 M. D. RUBIN 2,616,048

RELAXATION OSCILLATOR CIRCUITS

Filed March 23, 1948 3 Sheets-Sheet 1

INVENTOR
MILTON D. RUBIN
BY
ATTORNEY

RELAXATION OSCILLATOR CIRCUITS

Filed March 23, 1948 3 Sheets-Sheet 2

INVENTOR
MILTON D. RUBIN
BY
ATTORNEY

Oct. 28, 1952 M. D. RUBIN 2,616,048

RELAXATION OSCILLATOR CIRCUITS

Filed March 23, 1948 3 Sheets-Sheet 3

INVENTOR
MILTON D. RUBIN
BY Elmer J. Gorn
ATTORNEY

Patented Oct. 28, 1952 2,616,048

UNITED STATES PATENT OFFICE 2,616,048

RELAXATION OSCILLATOR CIRCUITS

Milton D. Rubin, Dorchester, Mass., assignor to Raytheon Manufacturing Company, Newton, Mass., a corporation of Delaware Application March 23, 1948, Serial No. 16,467

7 Claims. (Cl. 250—36)

This invention relates to electrical circuits, and more particularly to a method and means for synchronization of a relaxation oscillator, such as a blocking oscillator.

An object of this invention is to devise a novel method for synchronizing a relaxation oscillator.

Another object is to devise a method for synchronizing a relaxation oscillator which method is effective whether the natural period of such oscillator is greater or less than the synchronizing pulse period.

A further object is to devise a circuit the use of which enables exact adjustment of the natural period of the oscillator to the synchronizing pulse period, without the risk of a slight change thereafter causing the oscillator to fall out of synchronization.

A still further object is to provide means for broadening the range of lock-in of a relaxation oscillator.

An additional object is to provide a means for obtaining accurate frequency multiplication and frequency division with relaxation oscillators.

The foregoing and other objects of the invention will be best understood from the following description of exemplifications thereof, reference being had to the accompanying drawings, wherein.

Figure 1:
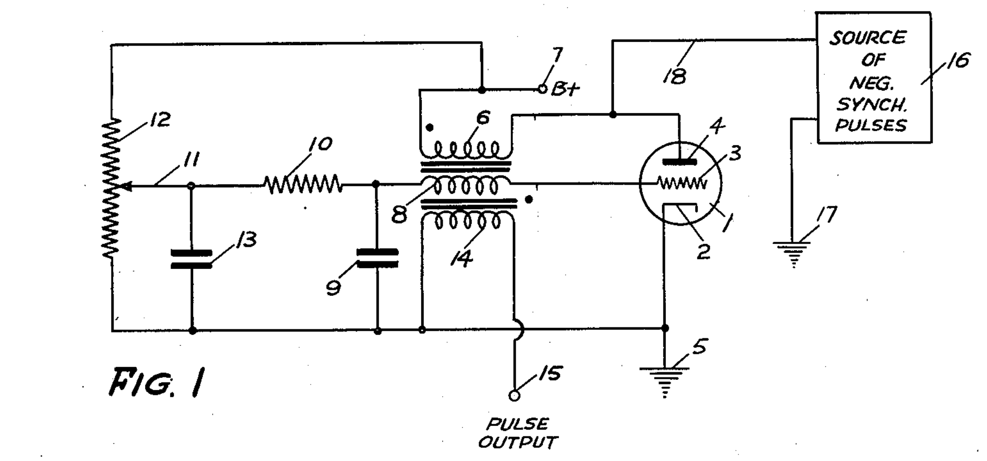
Fig. 1 is a circuit diagram of a basic synchronizable blocking oscillator.

Now referring to Fig. 1, a triode 1 has cathode 2, grid 3, and anode 4. Cathode 2 is grounded at 5. Anode 4 is connected through one winding 6 of a transformer to a terminal 7 of a suitable source of positive voltage. Grid 3 is connected through a second winding 8 of the transformer and through a grid condenser 9 to ground 5.

A discharge and biasing circuit is provided for condenser 9 and grid 3, consisting of a resistor 10, one end of which is connected to the ungrounded side of condenser 9 and the other end of which is connected to the movable tap 11 of a potentiometric resistor 12, one end of which is connected to positive terminal 7 and the other end of which is connected to ground 5; said circuit also includes a condenser 13, one plate of which is connected to tap 11 and the other plate of which is connected to ground 5. In order to obtain a pulse output from the blocking oscillator, a third winding 14 of the transformer has one end connected to ground 5 and its opposite end connected to a terminal 15 from which the pulse output may be taken.

The capacitance of condenser 13 is large compared to that of condenser 9. In effect, therefore, the condenser 13 is a storage condenser and bypasses the resistance of resistor 12. Thus, such resistance has no appreciable effect on the discharge time of condenser 9 or on the time constant of the R. C. circuit 9—10; potentiometric resistor 12 is merely a source of controllable bias voltage.

The dots at windings 6 and 8 indicate similar polarities. For example, if a current flows through one winding so that the dot end is positive, the field set up in the core of the transformer induces voltages in the other windings, making the dot end positive in the other winding at the same time.

The transformer including windings 6 and 8 is employed to feed back energy from the plate to the grid of tube 1. Any change that takes place in the plate circuit will induce a voltage in the grid circuit which will act to aid this change, due to the way in which windings 6 and 8 are coupled. We will neglect, for the moment, the positive potential applied to the upper plate of grid condenser 9 by means of tap 11 on potentiometric resistor 12; the purpose and function of this potential will be explained subsequently. Now, assume that the grid condenser 9 has been negatively charged by a preceding cycle. The tube 1, therefore, is biased well below cut-off, cut-off being indicated in Fig. 2 as the horizontal line so labeled below or negative a few volts from the zero axis or ground 5, the potential of cathode 2. As the charge on condenser 9 leaks off through resistor 10 and the lower portion of resistor 12, the biasing voltage on grid 3 is reduced to the point where the tube 1 begins to conduct. This point is denoted by $a$ on curve A in Fig. 2 which represents the voltage of grid 3 with respect to ground 5 or cathode 2. As plate current starts to flow, a magnetic field is set up around the plate winding 6 of the transformer. This field builds up from zero to a maximum in direct proportion to the plate current, and therefore induces a voltage in the grid winding 8. This voltage is impressed upon the grid 3 of the tube with a polarity that drives the grid more and more positive as the field in the plate winding is building up. Thus, in Fig. 2, after point *a* the grid voltage increases.

The grid, when driven positive with respect to cathode 2, draws current, and electrons accumulate on the plate of the grid capacitor 9 nearest the grid, which is the upper plate thereof in Fig. 1. As the plate current reaches saturation, the field in the plate winding 6 ceases to increase. For an instant there is no induced voltage in the grid winding 8, and, because no charging potential is applied to condenser 9, said condenser begins to discharge. This discharge causes the positive potential on the grid to become less positive, causing a reversal in slope of the grid voltage at *b*, and thereby causing less plate current to flow in the plate winding 6. The field around said winding starts to collapse. This collapsing field, in turn, induces a voltage in the grid winding 8 in the reverse direction, causing the grid to become more and more negative, as shown after or to the right of point *b* in Fig. 2. This process continues until the grid 3 is driven beyond cut-off, completing a conducting cycle for tube 1. The electrons on condenser 9 discharge only very slowly to the cathode 2 because resistor 10 is large, placing a negative voltage on the grid as at point *c*.

Because of the slow discharge of condenser 9, electrons which have accumulated on the grid because of the grid current flow when the grid was positive, remain there in sufficient numbers to give it a large negative bias as at *c*, sufficient to hold the tube cut-off until some of the charge leaks off through resistors 10 and 12. Gradually the electrons piled up on condenser 9 pass through resistors 10 and 12 to reach the cathode 2. Then the negative bias on the grid slowly becomes less, as shown to the right of point *c* in Fig. 2. When the cut-off potential is again reached at *d*, electrons from the cathode once again reach the plate, plate current starts up, quickly reaches its high value, drives the grid positive, and the above process repeats itself. Thus, during every cycle there is a short, sharp pulse of plate current, followed by a period during which the tube blocks itself until the accumulated negative charge on the grid 3 leaks off again. The frequency of these pulses is determined not only by the impedance values of condenser 9 and resistors 10 and 12, but also by the amount of bias voltage applied to condenser 9 by potentiometer 12.

The space between points *a* and *d* represents one complete cycle of operation of the oscillator when it is operating by itself as determined by the condenser 9 and resistors 10 and 12. The time interval between points *a* and *d* is therefore termed the free or natural period of the relaxation or blocking oscillator.

A positive potential is applied to the upper plate of condenser 9 by means of tap 11 on potentiometric resistor 12. This potential functions to make the discharge curve of condenser 9 between points *c* and *d* steeper and more nearly linear. If such bias potential were not utilized, the curve between points *c* and *d* would be less steep and would asymptotically approach the zero axis, thus making the location of point *d* somewhat inconstant from cycle to cycle. However, with a positive bias potential the grid potential would tend to rise to a large positive value, corresponding to the bias potential value, along line B and would approach such positive potential level asymptotically, in the absence of other circuit action. In this way, the discharge curve *c*—*d* is made only the small initial portion of such an over-all discharge curve, so that curve *c*—*d* is steep and substantially linear, thus establishing point *d* more consistently from cycle to cycle and making the oscillator natural period a constant. This biasing potential arrangement, while desirable, is not essential to the operation of the invention.

It is possible to control the frequency of the oscillator described by a synchronizing voltage pulse of a predetermined or given periodicity, thus forcing the oscillator to oscillate at the frequency of the synchronizing impulses. For this purpose, a positive voltage pulse may be injected into the grid circuit of tube 1 at a time slightly before the instant *d*. To be effective, the natural period of the oscillator must be greater than the period of the synchronizing pulses, so that a synchronizing pulse is injected into the grid circuit before the point *d* in every cycle.

Figure 2:
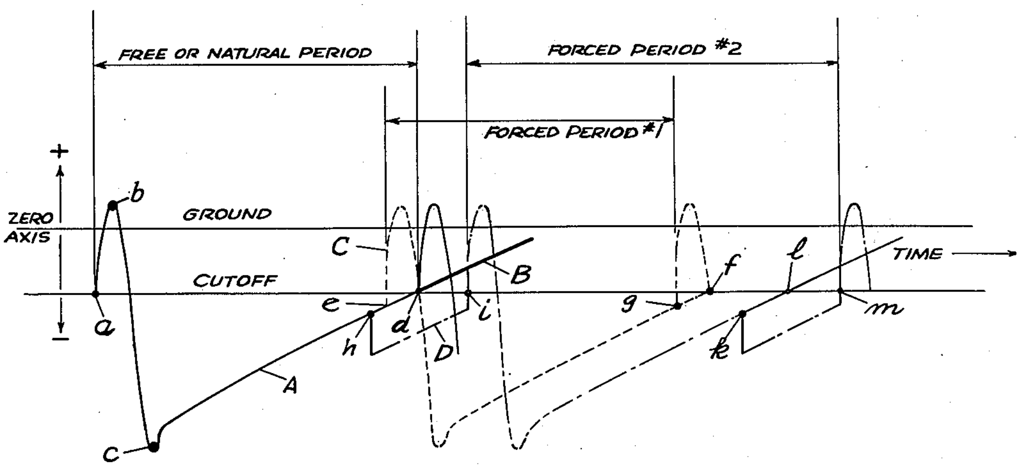
Fig. 2 is a set of curves illustrating certain features of operation of the circuit of Fig. 1.

In Fig. 2, the positive synchronizing voltage pulse is substantially rectangular, is injected into the grid circuit or algebraically added to the grid voltage at point *e*, and is of sufficient amplitude to carry the resultant grid voltage above the cut-off line at point *e*. Therefore, as shown by the curve C, the tube 1 begins to conduct at point *e* and begins to go through a cycle of oscillation exactly similar to that previously described at point or instant *e*, rather than at the later instant *d*, as would be the case with free oscillations or with an unsynchronized oscillator.

The time interval between points *e* and *f* is again equal to the free or natural period of the oscillator, while the smaller period between points *e* and *g* is the period of the synchronizing impulses. At time instant *g*, the positive synchronizing voltage pulse is again injected into the grid circuit, and again carries the resultant grid voltage above the cut-off line at point *g*, so that the tube again begins to conduct at instant *g* and again begins to go through a cycle of oscillation at instant *g*, rather than at the later instant *f*, as would be the case with free oscillations.

The time interval between points *e* and *g* is therefore the forced period of oscillation of the blocking oscillator, which period is equal to that of the synchronizing pulses and is shorter than the natural period of the oscillator. Thus, the oscillator is synchronized by the positive synchronizing impulses or forced to operate at the frequency of the synchronizing impulses, and synchronization takes place at the leading edge of the pulses.

Referring again to Fig. 1, in order to synchronize the blocking oscillator by positive pulses as above described, a source of negative voltage pulses 16 is provided, one output terminal of said source being grounded at 17 and the other output terminal being connected by means of a lead 18 to anode 4. The negative pulses appearing in lead 18 are coupled into the grid circuit of tube 1 by means of windings 6 and 8, which are inductively coupled to each other, the pulses being applied to winding 6 by lead 18, which is directly connected thereto. Since the dots adjacent these windings indicate similar polarities, positive pulses appear at the dot end of winding 6 and the dot end of winding 8, which is connected directly to grid 3. The source 16 of negative synchronizing impulses therefore functions to apply positive voltage impulses to the grid 3 of the blocking oscillator to lock in said oscillator at the synchronizing frequency, in the manner previously described.

In order to synchronize the oscillator with positive pulses as above, the natural period *a—d* of the oscillator must be greater than the period *e—g* of the synchronizing pulses. If the natural period of the oscillator were less than the period of the synchronizing impulses, the synchronizing impulses would be applied to the grid circuit at some instant after instant *d*, but the cycle of oscillation of the oscillator would nevertheless begin at point *d* because at this point the grid voltage reaches the cut-off value; therefore the synchronizing impulses would be ineffective for synchronizing and the oscillator would function at its natural period. Under these conditions, therefore, the synchronizing impulses lose control and the oscillator does not lock in at the synchronizing frequency. If the natural period of the oscillator is less than the synchronizing pulse period, this method of synchronization is therefore ineffective.

If the natural period of the oscillator is less than the period of the synchronizing pulses, lock-in of the oscillator at the synchronizing frequency can be secured by utilizing a negative synchronizing voltage pulse, as long as the said natural period is greater than the difference between the pulse period and the pulse width. Now considering again Fig. 2, a negative synchronizing voltage pulse is applied to or injected into the grid circuit of the blocking oscillator tube at the time instant represented by point *h*, this pulse being approximately rectangular. Therefore, the resultant grid voltage, which is the algebraic sum of this pulse voltage and the condenser voltage previously discussed, follows along curve D, which is substantially parallel to curves A and B and is displaced negatively therefrom by an amount equal to the amplitude of the pulse voltage. The grid voltage as shown by curve D is still held negatively beyond cut-off, by means of the negative voltage pulse injected, at instant *d*, which is the end of the natural period of the oscillator and the beginning of a new period for the unsynchronized oscillator. Therefore, the blocking oscillator is forced to oscillate at a period longer than its natural period.

The negative synchronizing impulse terminates or ends at instant *i*. At this instant, therefore, the negative voltage pulse being removed, the resultant grid voltage tends to return to the condenser voltage represented by curve B, which is above the cut-off voltage in the positive direction. At instant *i*, the trailing edge of the synchronizing voltage pulse, the grid voltage tends to go beyond cut-off in the positive direction. As soon as the cut-off voltage is reached at instant *i*, tube 1 again begins to conduct and the oscillator begins to go again through its cycle of oscillation in the manner previously described.

The time interval between points *i* and *l* is again equal to the natural period of the oscillator, determined by the impedance values of circuit components 9, 10 and 12. At time instant *k*, the negative synchronizing impulse is again injected into the grid circuit, and again holds completion of the sawtooth or completion of the forced period of oscillation, by holding the grid voltage beyond cut-off in the negative direction, until the instant *m* at the trailing edge of the synchronizing pulse, which latter instant occurs later than the instant *l* previously referred to. At instant *m* the resultant grid voltage again tends to go above cut-off in the positive direction. As soon as the cut-off voltage is reached at instant *m*, the tube 1 again begins to conduct to begin a new cycle of forced oscillation and to terminate a cycle of forced oscillation. Therefore, the tube begins to conduct at instant *m* and again begins to go through a cycle of oscillation at instant *m*, rather than at the earlier instant *l*, as would be the case with free oscillations.

The time interval between points *i* and *m* is therefore the forced period of oscillation of the blocking oscillator under these circumstances, which period is equal to that of the synchronizing pulses and is greater than the natural period of the oscillator. Thus, the oscillator is synchronized by the negative synchronizing impulses or forced to operate at the frequency of the synchronizing impulses, and synchronization takes place at the trailing edge of the pulses.

The circuit of Fig. 1 may also be used to synchronize the blocking oscillator by negative pulses as described above, in this case source 16 furnishing positive rather than negative synchronizing voltage pulses. Such positive pulses would be coupled into the grid circuit by means of windings 6 and 8 as before, the positive pulses appearing as negative voltage pulses at grid 3 because of the direction of coupling of said windings. Therefore, the oscillator would be locked in at the synchronizing frequency by means of the negative synchronizing impulses in the manner described.

In order to synchronize the oscillator with negative pulses as above, the natural period *a—d* of the oscillator must be less than the period *i—m* of the synchronizing pulses. If the natural period of the oscillator were greater than the period of the synchronizing impulses, the trailing edge of the synchronizing impulse would appear in the grid circuit some time before instant *l*, but in such event such trailing edge would not bring the grid voltage above the cut-off value in the positive direction and therefore would be ineffective to cause tube 1 to conduct to begin its cycle of oscillation; under such conditions the cycle of oscillation of the oscillator would nevertheless begin at point *l* because at this point the grid voltage reaches the cut-off value. Therefore, the synchronizing impulses would be ineffective for synchronizing and the oscillator would function at its natural period; the synchronizing impulses would lose control and the oscillator would not lock in at the synchronizing frequency. This method of synchronization is therefore ineffective if the natural period of the oscillator is greater than the synchronizing pulse period.

In addition, for the negative synchronizing pulse method to work, the natural period *a—d* of the oscillator must be greater than the difference *i—k* between the synchronizing pulse period and the synchronizing pulse width. If the natural period were less than this time interval *i—k*, point *l* would occur before point *k*, which means that the oscillator would be triggered to start a new cycle at point *l*, where the grid voltage reaches the cut-off value, and completion of the sawtooth could not be held off until point *m* by the negative impulse as desired, since the negative impulse is not applied to the grid until point *k* is reached. Under these conditions, also, the synchronizing impulses would be ineffective for synchronizing and the oscillator would function at its natural period or frequency.

To summarize the two methods of synchronization so far described herein, the first one described insures lock-in only for natural periods greater than the pulse period, and the second insures lock-in only for natural periods less than the pulse period but not less than the pulse period minus the pulse width.

Now, according to this invention, a method and means has been devised whereby synchronization takes place whether the natural period is greater than the pulse period or is less than the pulse period, provided that the natural period is not less than the difference between the pulse period and the negative pulse width. Furthermore, this invention is applicable also to frequency multiplication and frequency division arrangements, and in such arrangements synchronization takes place by the method of this invention, provided that in the former the time interval of the pulse period minus the negative pulse width (of the synchronizing pulse) is less than any particular predetermined integral multiple of the natural period, or that in the latter the natural period is greater than any particular predetermined integral number of synchronizing pulse periods plus one such time interval.

Figure 3:
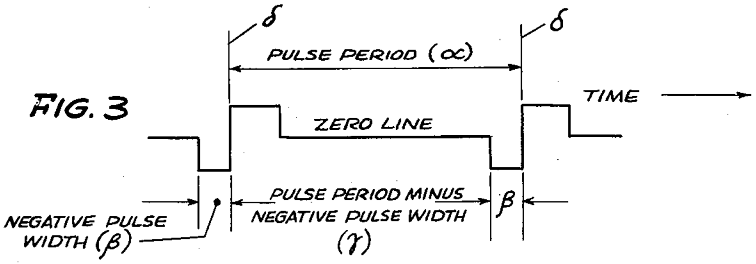
Figs. 3–4 are curves illustrating the operation of the invention.

Synchronization is accomplished according to this invention by injecting into the grid circuit of the blocking oscillator synchronizing voltage pulses having the shape shown in Fig. 3. Such pulses each consist of a negative portion followed immediately by a positive portion, the negative portion being joined to the positive portion by a middle or central rising portion which is very abrupt or which occurs substantially instantaneously or in substantially zero time. In other words, the positive portion of each pulse is immediately adjacent to the negative portion of the same pulse; the leading edge of the positive portion of each pulse occurs substantially simultaneously with the trailing edge of the negative portion of the same pulse.

As indicated in Fig. 3, the successive pulses are separated or spaced in time; the time interval between successive pulses is termed the pulse period $\alpha$. The width of the negative portion of the pulse is herein denoted by $\beta$, while the pulse period minus the negative pulse width is denoted by $\gamma$. In this invention, as will hereinafter be explained, synchronization of the blocking oscillator occurs at the time instants denoted by $\delta$.

Figure 4:
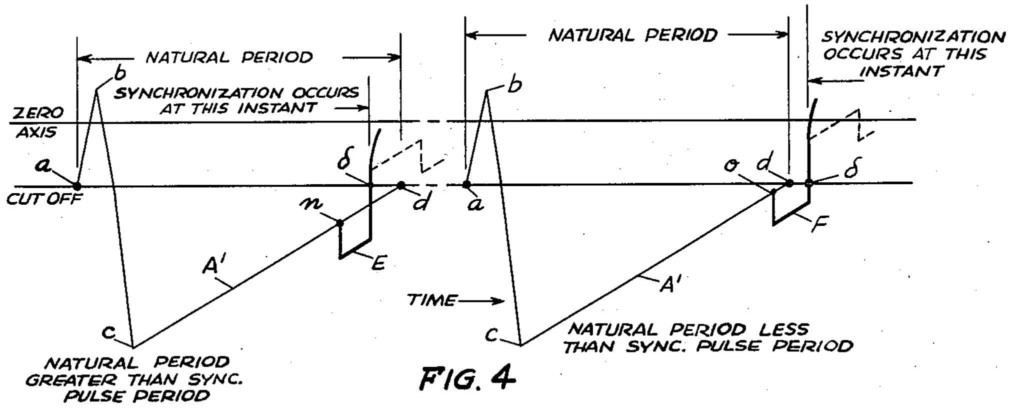

Fig. 4 is a set of grid voltage curves, similar to those of Fig. 2, illustrating the application of synchronizing pulses, of the type shown in Fig. 3, to a blocking oscillator for synchronizing the same, according to this invention.

In order to simplify the showing in Fig. 4, the grid voltage "curves" are shown as having sharp points and straight-line portions; however, it is to be understood that the actual grid voltage variations more nearly resemble the curves shown in Fig. 2.

The first or left-hand half of Fig. 4 illustrates the method of synchronization of a relaxation oscillator according to this invention, when the natural period of the oscillator is greater than the synchronizing pulse period. Curve A′ represents the grid-condenser voltage of the blocking oscillator tube, while points $a$, $b$, $c$ and $d$ are points of interest in connection with said curve and correspond to similar points in Fig. 2. The time interval $a$—$d$ is again the natural period of the oscillator. At point or time instant $n$, prior to instant $d$, a voltage pulse of the shape shown in Fig. 3 is injected into the grid circuit of the oscillator tube in such a way as to algebraically add the pulse voltage to the condenser-discharge voltage A′, giving a resultant voltage E. Such resultant voltage goes negative, with respect to curve A′, at instant $n$ by an amount equal to the amplitude of the negative portion of the applied synchronizing pulse. During the negative portion of the synchronizing pulse, the resultant grid voltage E is parallel to curve $a'$ but displaced downwardly therefrom by an amount equal to the amplitude of said negative portion.

The negative portion of the synchronizing voltage pulse ends at the instant $\delta'$ at which instant the trailing edge of said negative portion combines with the leading edge of the positive portion of said synchronizing pulse to cause the resultant grid voltage E to tend to go upwardly or in the positive direction substantially instantly to a value which is spaced above curve A′ an amount equal to the amplitude of the positive portion of the synchronizing impulse. The resultant grid voltage E, in its upward excursion at the instant $\delta$, reaches the cut-off axis as shown and tends to go above the cut-off voltage. When the cut-off voltage is reached, the oscillator tube begins to conduct at instant $\delta$ and begins to go through a cycle of oscillation at point or instant $\delta$, rather than at the later instant $d$, as would be the case with free oscillations or with an unsynchronized oscillator. Instant $d$ is later than instant $\delta$, since the natural period of the oscillator is greater than the synchronizing pulse period. It may be seen that the middle positive rise of the synchronizing pulse at instant $\delta$ completes the sawtooth by bringing the grid voltage up to cut-off before the end of the natural period at $d$; in other words, synchronization occurs at instant $\delta$ or the oscillator is forced or made to begin its cycle of oscillation at said instant, which is the trailing edge of the negative portion of the synchronizing pulse or the leading edge of the positive portion of said synchronizing pulse. Thus, synchronization occurs, according to this invention, at the middle positive rise of the synchronizing voltage pulse, when the natural period $a$—$d$ of the oscillator is greater than the synchronizing pulse period $a$—$\delta$.

The second or right-hand half of Fig. 4 illustrates the method of synchronization of a relaxation oscillator according to this invention, when the natural period of the oscillator is less than the pulse period but is greater than the pulse period minus the negative pulse width, or the time interval $\gamma$ in Fig. 3. Again, curve A′ represents the grid-condenser voltage of the blocking oscillator tube, while points $a$, $b$, $c$ and $d$ are points of interest in connection with said curve and correspond to similar points in Fig. 2. The time interval $a$—$d$ is again the natural period of the oscillator. At point or time instant $o$, prior to instant $d$, a voltage pulse of the shape shown in Fig. 3 is injected into the grid circuit of the oscillator tube in such a way as to algebraically add the pulse voltage to the condenser-discharge voltage A′, giving a resultant voltage F. Such resultant voltage goes negative with respect to curve A′ at instant $o$ by an amount equal to the amplitude of the negative portion of the applied synchronizing pulse. During the negative portion of the synchronizing pulse, the resultant grid voltage F is parallel to curve A′ but displaced downwardly therefrom by an amount equal to the amplitude of said negative portion.

The negative portion of the synchronizing voltage pulse ends at the instant δ, at which instant the trailing edge of said negative portion combines with the leading edge of the positive portion of said pulse to cause the resultant grid voltage F to tend to go upwardly or in the positive direction substantially instantly to a value which is spaced above curve A' an amount equal to the amplitude of the positive portion of the synchronizing impulse. Instant δ occurs later than instant *d*, and instant *d* is between instants *o* and δ, because the natural period of the oscillator is less than the synchronizing pulse period and because such natural period is greater than the synchronizing pulse period minus the negative synchronizing pulse width.

The resultant grid voltage F, in its upward excursion at the instant δ, reaches the cut-off axis as shown and tends to go above the cut-off voltage. When the cut-off voltage is reached, the oscillator tube begins to conduct at instant δ and begins to go through a cycle of oscillation at point or instant δ, rather than at the earlier instant *d*, as would be the case with free oscillations or with an unsynchronized oscillator. It may be seen that the negative portion of the synchronizing voltage pulse holds or delays completion of the sawtooth voltage wave beyond the end of the natural period at *d*, until the instant δ, by holding the grid voltage beyond cut-off in the negative direction until said latter instant; the completion of the sawtooth voltage wave is delayed until the middle rise of the synchronizing pulse at instant δ. In other words, synchronization occurs at instant δ or the oscillator is forced or made to begin its cycle of oscillation at said instant, which is the trailing edge of the negative portion of the synchronizing pulse or the leading edge of the positive portion of said synchronizing pulse. Thus, synchronization occurs, according to this invention, at the middle positive rise of the synchronizing voltage pulse, when the natural period *a—d* of the oscillator is less than the synchronizing pulse period *a*—δ but is greater than the time interval γ or *a—o*.

It may be seen, from the above, that, when a voltage pulse having the shape shown in Fig. 3 is utilized according to this invention as the synchronizing impulse for a relaxation or blocking oscillator, synchronization of such oscillator takes place at the same part of the synchronizing pulse, regardless of whether the natural period of the oscillator is greater or less than the synchronizing pulse period, as long as the said natural period is not less than the pulse period minus the pulse width. Thus, by adjusting the natural period of the oscillator by hand or automatically, there is a range of lock-in in which, as said natural period is varied smoothly from below the pulse period to above the pulse period, the oscillator remains synchronized at the pulse frequency. This range of lock-in covers any natural period above the pulse period minus the pulse width, the upper limit of the natural period which is still in lock-in range being determined by the amplitude of the positive portion of the synchronizing impulse. Due to the provision by this invention of a range of lock-in which spans the natural period, a very desirable result is reached, because, as long as this range is observed as a limit, synchronization is never lost. Therefore, by this invention the natural period can be adjusted exactly to the synchronizing period, without running the risk of a slight change in natural period of the oscillator causing the oscillator to fall out of synchronization.

The result effected by the operation of this invention is especially desirable or beneficial for accurate frequency multiplication arrangements. In this case, it is desired that the relaxation oscillator have a natural frequency which is some integral multiple of the synchronizing frequency, and it is desirable to be able to adjust said natural frequency so that it is very close to this multiple, whereby a minimum of synchronization resetting takes place each time the synchronizing pulse occurs. Such close adjustment of the natural frequency is very feasible according to this invention, without risk of losing synchronization. In this case, for frequency multiplication, the pulse period minus the negative pulse width should be less than a predetermined integral multiple (determined by the desired multiplication factor) of the natural period.

Accurate frequency division is also possible by use of this invention, because very close adjustment of the natural frequency is entirely feasible without risk of losing synchronization. For frequency division, the natural period should be greater than a predetermined integral number (determined by the desired division factor minus one) of the pulse periods *a* plus one time interval γ.

Figure 5:
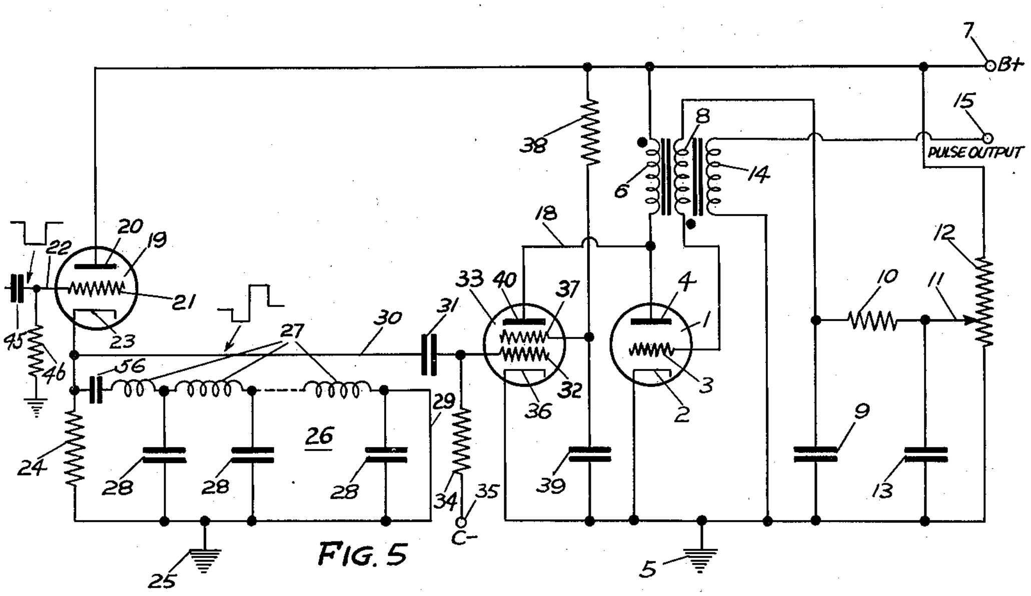
Fig. 5 is a circuit diagram of a blocking oscillator and synchronizing means therefor according to this invention.

Fig. 5 is a circuit diagram of a blocking oscillator and synchronizing circuit according to this invention. Elements the same as those of Fig. 1 are denoted by the same reference numerals. A triode 19 has its plate 20 connected to the terminal 7 of a source of positive voltage, its grid 21 connected by means of a lead 22 and a condenser 45 to a suitable source of negative substantially rectangular impulses (not shown), and its cathode 23 connected through a resistor 24 to ground 25. The grid side of condenser 45 is connected to ground through a leak resistor 46. A delay line or artificial transmission line 26, consisting of a series of inductances 27 and shunt capacitances 28 connected as shown, has the resistor 24 connected as a terminating resistor at its input and has its output end short-circuited by a connection 29. The tube 19 is capacitively coupled to line 26 by a condenser 56. The delay line 26 is in effect connected across resistor 24, and has an electrical length equal to half the width of the negative pulse applied to grid 21 or to the input of delay line 26.

If a negative voltage pulse is applied to the input of a shorted delay line having a length equal to half the pulse width and having a terminating resistor at its input, a positive voltage pulse will be reflected back and will occur at the delay line input at the end of the initial pulse. Thus, in response to a negative voltage pulse applied by way of grid 21 and tube 19 to the input of delay line 26, the voltage appearing in lead 30 will have the waveform represented by the curve adjacent said lead, which represents an initial negative pulse followed immediately, at its end, by a positive pulse. This is the waveform illustrated in Fig. 3 and is the pulse shape desired and utilized for synchronization according to this invention, as described previously in connection with Fig. 4. Lead 30 is connected to cathode 23 and to the input of delay line 26.

The negative-positive synchronizing voltage pulses appearing in lead 30 are coupled through a condenser 31 to the control grid 32 of a coupling tetrode 33, control grid 32 being connected through a grid leak resistor 34 to a terminal 35 of a suitable source of negative biasing voltage. Cathode 36 of tube 33 is connected to ground 5. Screen grid 37 of tube 33 is biased by being connected through a resistor 38 to positive terminal 7, a bypass condenser 39 being connected between said screen grid and ground 5. Coupling tube 33 serves to reverse the polarity of the pulses applied to its input, so that, in the circuit of the anode 40 of said tube, a reversed-polarity pulse is provided; therefore, a positive-negative pulse appears in the anode lead 18.

All of the circuit components so far described in connection with Fig. 5 correspond to the source 16 of Fig. 1, the lead 18 from anode 40 corresponding to lead 18 in Fig. 1 and being connected directly to anode 4 of the blocking oscillator triode 1. The remainder of the Fig. 5 circuit functions in a similar manner to the blocking oscillator synchronizing circuit of Fig. 1. Due to the manner in which windings 6 and 8 are coupled, the reversed-polarity pulses appearing in the anode lead 18 are again reversed in their eventual application to grid 3 of oscillator tube 1, giving pulses of the original polarity (negative-positive) on said grid; in other words, the pulses applied to said grid are of the same polarity as those appearing in lead 30. Therefore, the desired negative-positive synchronizing voltage pulses are applied to the grid 3 of the blocking oscillator tube 1 and function to synchronize said oscillator at the middle positive rise of each pulse, as previously explained in connection with Fig. 4; synchronization occurs at the common instant of the trailing edge of the negative portion of the pulse and the leading edge of the positive portion of the pulse.

The pulse transformers 6, 8, 14 should have enough inductance to pass the total width of each synchronizing pulse therethrough.

With the circuit described, the impedance values of resistor 10 and capacitor 9, and the voltage supplied from the potentiometer-capacitor combination 12—13, can be set or adjusted to provide a natural period for the blocking oscillator equal to a multiple of, or a submultiple of, the synchronizing pulse period, with full synchronization taking place under any of these conditions.

The output of the oscillator can be taken as a pulse from terminal 15 as shown, or as a sawtooth voltage wave from the grid condenser 9.

Figure 6:
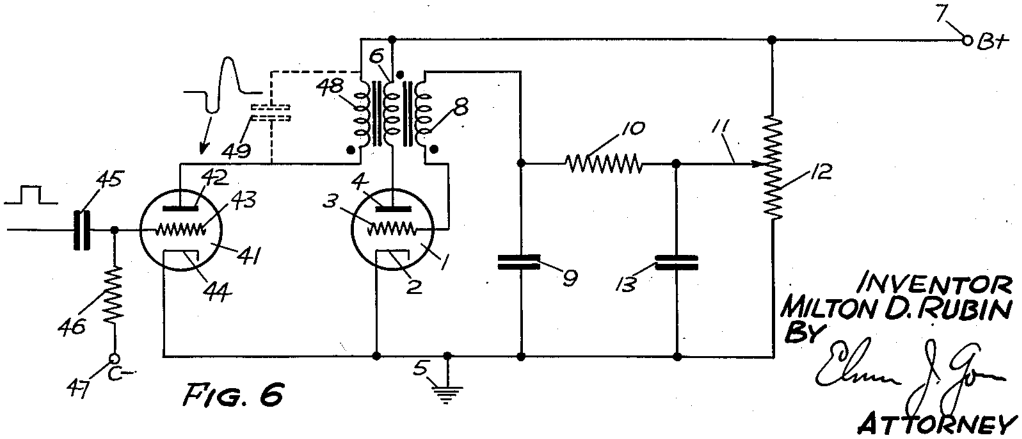
Fig. 6 is a diagram of a modified blocking oscillator and synchronizing means.

Fig. 6 is a diagrammatic illustration of a modified blocking oscillator and synchronizing circuit for producing the desired pulse shape shown in Fig. 3. The blocking oscillator circuit components which are the same as those of Fig. 1 are denoted by the same reference numerals. A tube 41 has anode 42, grid 43, and cathode 44, which is connected to ground 5. A source (not shown) of positive substantially rectangular voltage impulses supplies such pulses to grid 43 through a condenser 45, said grid being connected through a leak resistor 46 to a terminal 47 of a source of negative biasing voltage. Anode 42 is connected through a transformer winding 48, which is inductively coupled to windings 6 and 8, to positive terminal 7.

The dots on windings 6, 8 and 48 indicate similar polarities, as in Figs. 1 and 5. The distributed capacitance of winding 48 is indicated at 49.

The connection of elements 41, 48 and 49 and the supplying of positive rectangular pulses, as described, which are inverted to negative pulses in the plate circuit, amount to essentially the placing of a resistance (the anode-cathode resistance of tube 41) in series with a parallel LC circuit (elements 48 and 49) across a source of negative rectangular voltage impulses. In such a circuit, the leading edge of the positive rectangular input pulse causes the voltage across the inductance or winding 48 to go negative, this voltage remaining negative during the entire width of the input rectangular pulse. At the trailing edge of the input pulse, a sudden reversal of the voltage across inductance 48 occurs, said voltage going positive at this instant. This sudden reversal occurs almost instantaneously or in substantially zero time and serves as the middle positive rise of the synchronizing pulse which effects synchronization of the blocking oscillator in the manner described above. In other words, due to resonance phenomena there is a damped oscillation effected at the trailing edge of the rectangular input pulse or at the said reversal of the voltage across winding 48, causing said voltage to go positive and then to decrease from its positive value toward zero.

To summarize, the voltage across winding 48 first goes negative, remains negative for a predetermined time, then very suddenly goes positive and thereafter declines from its positive value toward zero. The waveform of the voltage in the plate of tube 41, or across winding 48, is therefore substantially as indicated by the curve adjacent the plate lead of said tube. Due to the manner in which winding 48 is coupled to grid winding 8, this waveform is reproduced in said grid winding, the grid end of said grid winding having the same relative polarity as described above for the plate end of winding 48. Therefore, the waveform of the voltage pulse described above is applied to grid 3 of oscillator tube 1.

This waveform is substantially of the shape illustrated in Fig. 3, and is a negative-positive pulse. This is the pulse shape desired and utilized for synchronization according to this invention, as described in connection with Fig. 4. The desired negative-positive synchronizing pulses are applied to grid 3 of blocking oscillator tube 1 and serve to synchronize said oscillator at the middle positive rise of each pulse; synchronization occurs at the common instant of the trailing edge of the negative portion of the pulse and the leading edge of the positive portion of the pulse.

Figure 7:
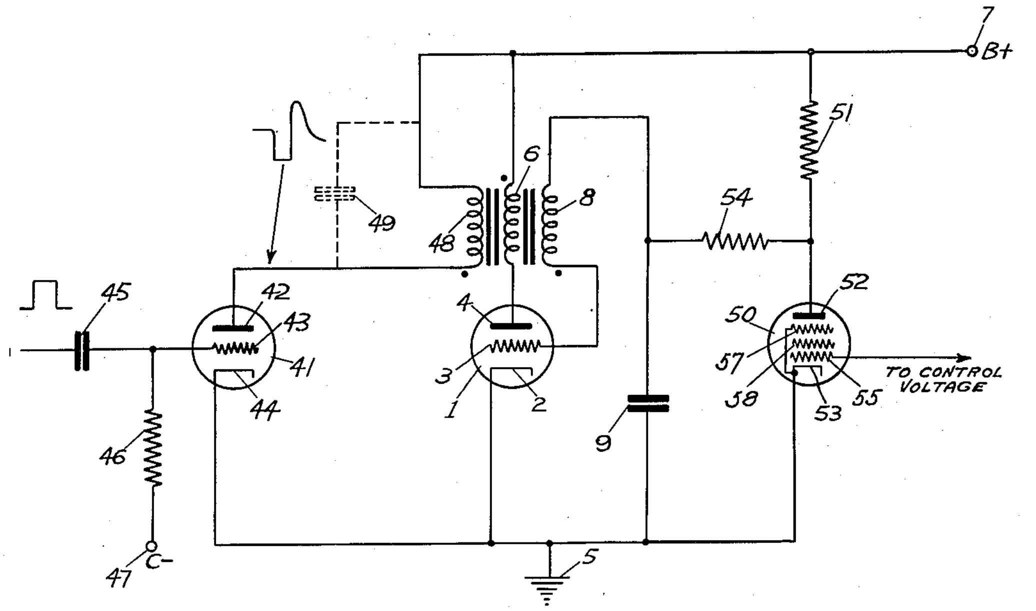
Fig. 7 is a diagram of a modification of Fig. 6.

Fig. 7 illustrates a circuit substantially like Fig. 6 but in which the natural frequency of the oscillator may be controlled in a different manner. In Fig. 7, the potentiometer which supplies bias potential to the upper plate of condenser 9 and grid 3 has been removed and replaced with a pentode 50 and its plate resistor 51, said pentode having an anode 52, a supply grid 57 connected to cathode 53, a screen grid 58, and a control grid 55. Anode 52 is connected through resistor 51 to positive terminal 7, while the cathode 53 of said tube is connected to ground 5. The upper or ungrounded plate of grid condenser 9 is connected by a resistor 54 to a point between resistor 51 and anode 52. Control grid 55 is adapted to be connected to a suitable source of control voltage in order to control current flow in tube 50.

The voltage at the plate 52 of tube 50 is controllable by the control voltage applied to grid 55 of said tube, since the current flow in said tube is controllable by the grid voltage thereof. Between the positive terminal 7 and ground, there are connected in series the IR voltage drop in resistor 51 and the voltage drop of tube 50, the tube voltage drop being variable by variation of the voltage applied to control grid 55. The voltage at plate 52 is applied directly to condenser 9 by means of resistor 54 to bias said condenser positively. Thus, the tube 50 serves substantially solely as a variable voltage source or potentiometer, the resistor 54 isolating the plate circuit of said tube from the changes of voltage on condenser 9 and resistor 51 playing substantially no part in the time constant of the condenser discharge circuit or in the natural frequency of the blocking oscillator. As discussed hereinabove, the grid potential on grid 3 and the potential of the condenser 9 both tend to rise toward a positive value corresponding to the bias potential value, during the discharge of the grid condenser 9. Therefore, by varying the voltage at the plate 52 the condenser bias potential value is changed, also changing the slope of the condenser-discharge curve and changing the time of discharge of the condenser from its negative potential value to cut-off voltage, since the end voltage to which the condenser 9 tends to charge is changed also. Since the effective discharge time of the grid condenser from its high negative potential value to cut-off potential determines the natural frequency of the oscillator, such natural frequency is proportional to the voltage at plate 52 of tube 50 or to the control voltage applied to grid 55 of said tube.

The blocking oscillator and synchronizing portions of the Fig. 7 circuit operate in the same manner as described in connection with Fig. 6, the only difference between these two figures being in the manner of control or variation of the natural frequency of the blocking oscillator. The circuit of Fig. 7 is adapted for use for both automatic frequency and phase correction, the frequency correction being effected by means of tube 50 and the phase correction being effected by means of the synchronizing impulses and tube 41.

Of course, it is to be understood that this invention is not limited to the particular details as described above, as many equivalents will suggest themselves to those skilled in the art. For example, instead of using synchronizing pulses the negative and positive portions of which are substantially flat on top, it may be desirable to provide pulse portions the tops and bottoms of which slope downwardly from the leading edge to the trailing edge of each of the pulse portions. Various other variations will suggest themselves. It is accordingly desired that the appended claims be given a broad interpretation commensurate with the scope of this invention within the art.

What is claimed is:

1. In combination, a relaxation oscillator having a natural frequency of oscillation and including an electron tube with anode and cathode and having a control grid element which undergoes a periodic variation in voltage of which a portion in each cycle changes gradually from a potential level below cut-off to a potential level at cut-on, means for generating periodically at a synchronizing frequency close to said natural frequency a voltage impulse having first and second immediately consecutive parts of opposite sense with an abrupt voltage change at their juncture, and means for superimposing said impulse upon said portion with said first part in opposition to the change in grid voltage toward said cut-on potential level.

2. In combination, a relaxation oscillator having a natural frequency of oscillation and including an electron tube with anode and cathode and having a control grid element which undergoes a periodic variation in voltage of which a portion in each cycle changes gradually from a potential level below cut-off to a potential level at cut-on, means for generating periodically at a synchronizing frequency close to said natural frequency a voltage impulse having first and second immediately consecutive parts of opposite sense with an abrupt voltage change at their juncture, and means for applying said impulse to said grid with said first part in opposition to the change in grid voltage toward said cut-on potential level, at least the leading edge of said first part occurring during said portion.

3. In combination, a relaxation oscillator having a natural frequency of oscillation and including an electron tube with anode and cathode and having a control grid element which undergoes a periodic variation in voltage of which a portion in each cycle changes gradually from a potential level below cut-off to a potential level at cut-on, means for generating periodically at a synchronizing frequency close to said natural frequency a voltage impulse having first and second immediately consecutive parts of opposite sense with an abrupt voltage change at their juncture, and means for applying said impulse to said grid with said first part in opposition to the change in grid voltage toward said cut-on potential level at a time such that the instant when said portion arrives at said cut-on potential level is included within the duration of said impulse.

4. In combination, a relaxation oscillator having a natural frequency of oscillation and including an electron tube with anode and cathode and having a control grid element which undergoes a periodic variation in voltage of which a portion in each cycle changes gradually from a potential level below cut-off to a potential level at cut-on, means for generating periodically at a synchronizing frequency close to said natural frequency, a voltage impulse having first and second immediately consecutive parts of opposite sense with an abrupt voltage change at their juncture, and means for applying said impulse to said tube during said portion with said first part tending to oppose the effect of the change in said grid potential toward said cut-on potential level.

5. In combination, a relaxation oscillator having a natural frequency of oscillation and including an electron tube with anode and cathode and having a control grid element which undergoes a periodic variation in voltage of which a portion in each cycle changes gradually from a potential level below cut-off to a potential level at cut-on, means for generating periodically at a synchronizing frequency close to said natural frequency a voltage impulse having first and second immediately consecutive parts of opposite sense with an abrupt voltage change at their juncture, and means for applying said impulse to said tube during said portion with said first part tending to oppose the effect of the change in said grid potential toward said cut-on potential level, at a time such that the instant when said portion arrives at said cut-on potential level is included within the duration of said impulse.

6. In combination, a blocking oscillator including an electron tube with anode and cathode and having a control grid element which undergoes a periodic variation in voltage of which a portion in each cycle changes gradually from a potential level below cut-off to a potential level at cut-on, means for generating a periodically repeated voltage impulse having first and second parts of opposite sense with an abrupt voltage change at their juncture, and means for applying said impulse to said tube once in each cycle of said blocking oscillator with said first part tending to oppose the effect of the change in said grid potential toward said cut-on potential level, the natural frequency of said blocking oscillator being such with respect to the frequency of said impulses that at least the leading edge of said first part occurs during said portion.

7. In combination, a blocking oscillator including an electron tube with anode and cathode and having a control grid element which undergoes a periodic variation in voltage of which a portion in each cycle changes gradually from a potential level below cut-off to a potential level at cut-on, means for generating a periodically repeated voltage impulse having first and second parts of opposite sense with an abrupt voltage change at their juncture, and means for applying said impulse to said tube once in each cycle of said blocking oscillator with said first part tending to oppose the effect of the change in said grid potential toward said cut-on potential level, the natural frequency of said blocking oscillator being such with respect to the frequency of said impulses that each impulse is applied to said tube at a time when the instant when said portion arrives at said cut-on level is included within the duration of said impulse.

MILTON D. RUBIN.

REFERENCES CITED

The following references are of record in the file of this patent:

UNITED STATES PATENTS

| Number | Name | Date |
|---|---|---|
| 2,118,626 | Smith | May 24, 1938 |
| 2,226,459 | Bingley | Dec. 24, 1940 |
| 2,358,297 | Bedford | Sept. 19, 1944 |
| 2,392,114 | Bartelink | Jan. 1, 1946 |
| 2,428,604 | Augier | Oct. 7, 1947 |
| 2,440,547 | Jensen | Apr. 27, 1948 |
| 2,448,034 | Labin et al. | Aug. 31, 1948 |
| 2,466,044 | Schoenfeld | Apr. 5, 1949 |
| 2,537,077 | McVay et al. | Jan. 9, 1951 |